United States Patent
Kim

(10) Patent No.: US 12,438,374 B2
(45) Date of Patent: Oct. 7, 2025

(54) ENERGY STORAGE SYSTEM ASSOCIATED WITH SOLAR SYSTEM AND METHOD FOR CONTROLLING ENERGY STORAGE SYSTEM

(71) Applicant: LG ENERGY SOLUTION, LTD., Seoul (KR)

(72) Inventor: Jongcheol Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 18/279,303

(22) PCT Filed: Aug. 31, 2022

(86) PCT No.: PCT/KR2022/013015
§ 371 (c)(1),
(2) Date: Aug. 29, 2023

(87) PCT Pub. No.: WO2023/058908
PCT Pub. Date: Apr. 13, 2023

(65) Prior Publication Data
US 2024/0136821 A1  Apr. 25, 2024
US 2024/0235201 A9  Jul. 11, 2024

(30) Foreign Application Priority Data
Oct. 6, 2021  (KR) .................. 10-2021-0132117

(51) Int. Cl.
*H02J 3/32* (2006.01)
*H02J 3/38* (2006.01)
*H02J 7/35* (2006.01)

(52) U.S. Cl.
CPC ............... *H02J 3/32* (2013.01); *H02J 3/381* (2013.01); *H02J 7/35* (2013.01); *H02J 2207/20* (2020.01); *H02J 2300/26* (2020.01)

(58) Field of Classification Search
CPC ...... H02J 3/32; H02J 3/381; H02J 7/35; H02J 2207/20; H02J 2300/26; G05F 1/67; Y02E 10/56; Y02E 70/30
(Continued)

(56) References Cited

U.S. PATENT DOCUMENTS 10,340,703 B2   7/2019   Palombini et al.
10,559,960 B2   2/2020   Zhang
(Continued)

FOREIGN PATENT DOCUMENTS

CN   111900710 A   11/2020
JP   6894219 B2    6/2021
(Continued)

OTHER PUBLICATIONS

Extended European Search Report for European Application No. 22878729.7, dated Aug. 16, 2024.
(Continued)

*Primary Examiner* — Richard Tan
(74) *Attorney, Agent, or Firm* — Birch, Stewart, Kolasch & Birch, LLP

(57) ABSTRACT

An energy storage system, connected with a photovoltaic system and a power grid, may include a plurality of DC/DC converters for controlling a plurality of battery racks, a power conversion system for controlling power in connection with the plurality of DC/DC converters and the photovoltaic system, and a power management controller for determining operating modes and outputting references of the power conversion system and the plurality of DC/DC converters according to a state of the photovoltaic system.

23 Claims, 9 Drawing Sheets

(58) Field of Classification Search
USPC .......................................................... 307/46
See application file for complete search history.

(56) References Cited

U.S. PATENT DOCUMENTS

| | | | |
|---|---|---|---|
| 10,951,040 | B2 | 3/2021 | Liu |
| 11,451,052 | B2 * | 9/2022 | Au .......................... H02J 3/388 |
| 2011/0133556 | A1 | 6/2011 | Choi |
| 2011/0291479 | A1 | 12/2011 | Lee |
| 2012/0153726 | A1 | 6/2012 | Moon |
| 2021/0255595 | A1 | 8/2021 | Somani et al. |

FOREIGN PATENT DOCUMENTS

| | | |
|---|---|---|
| KR | 10-2011-0062852 A | 6/2011 |
| KR | 10-1174891 B1 | 8/2012 |
| KR | 10-1243909 B1 | 3/2013 |
| KR | 10-1752465 B1 | 7/2017 |
| KR | 10-1849664 B1 | 4/2018 |
| KR | 10-2019087 B1 | 9/2019 |
| KR | 10-2020-0056956 A | 5/2020 |
| KR | 10-2180879 B1 | 11/2020 |
| KR | 10-2180880 B1 | 11/2020 |

OTHER PUBLICATIONS

International Search Report (PCT/ISA/210) issued in PCT/KR2022/013015 mailed on Dec. 16, 2022.

* cited by examiner

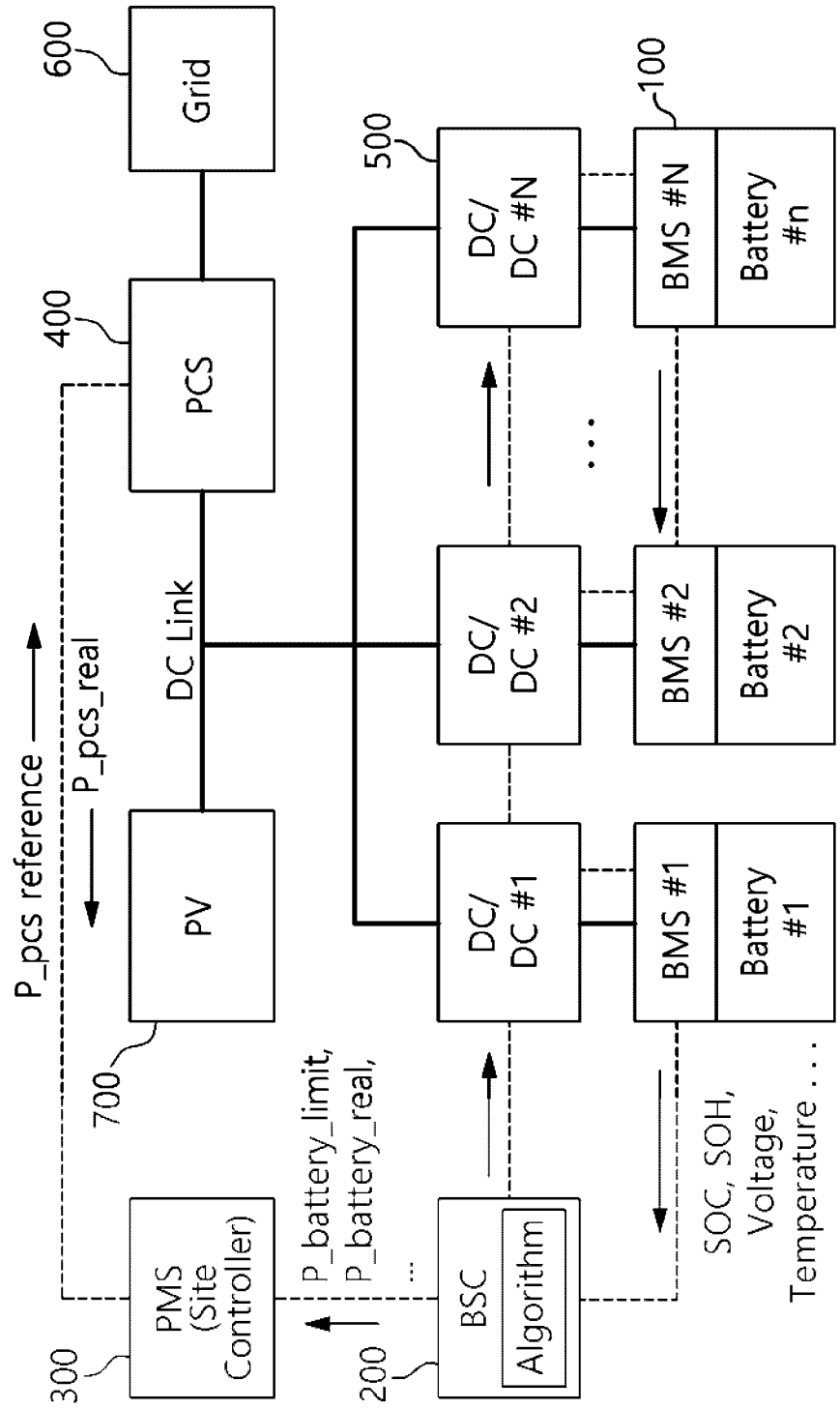
[Figure 1]

[Figure 2]
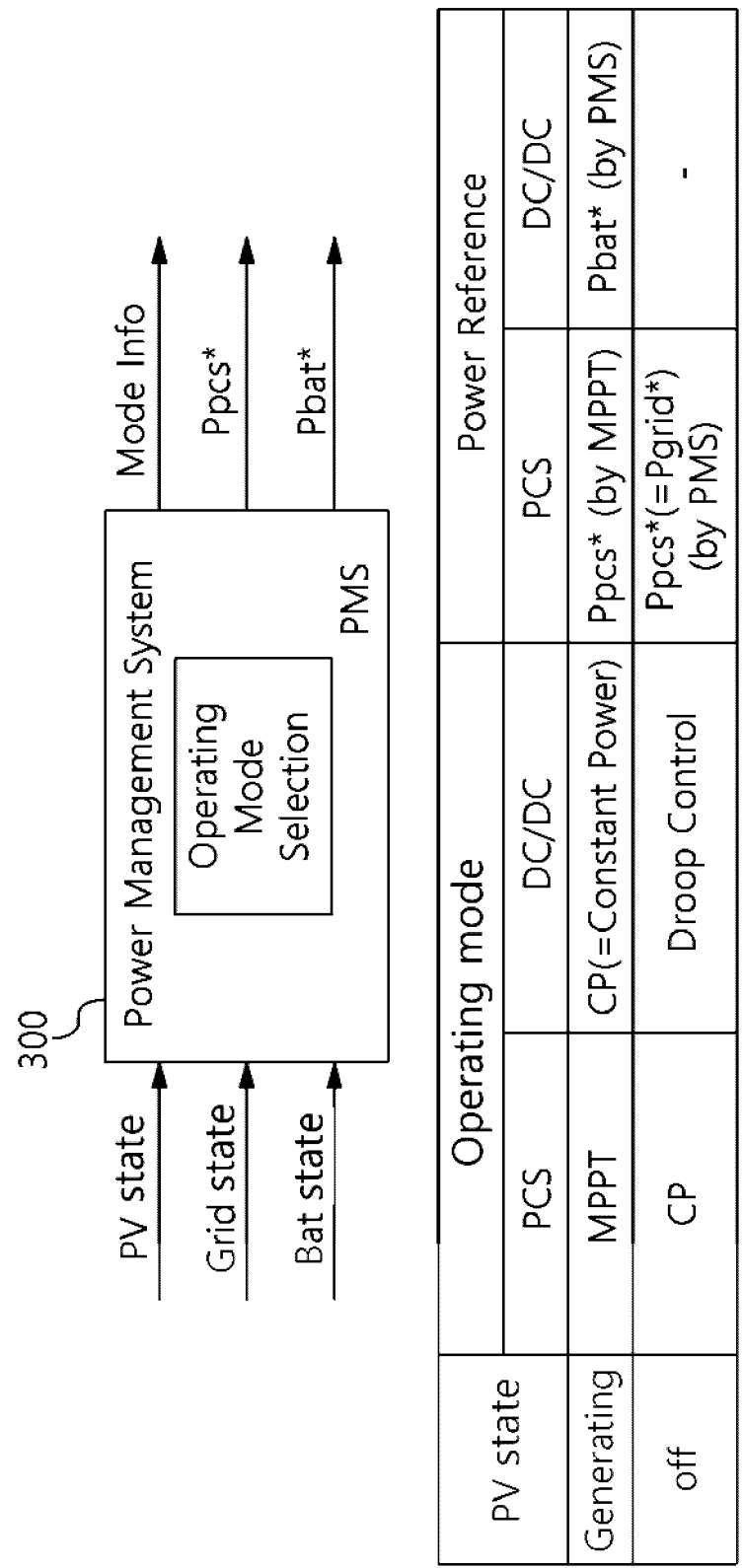

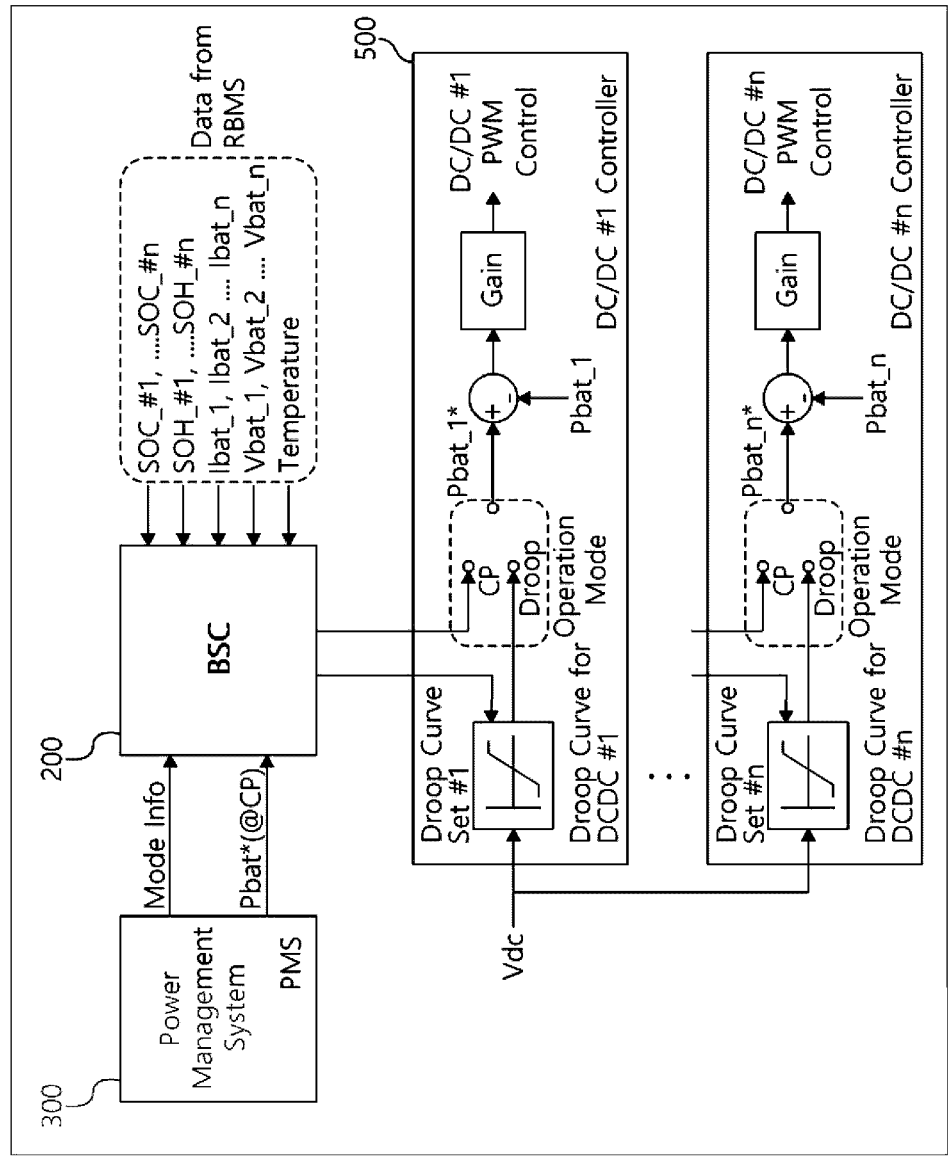
[Figure 3]

[Figure 4]
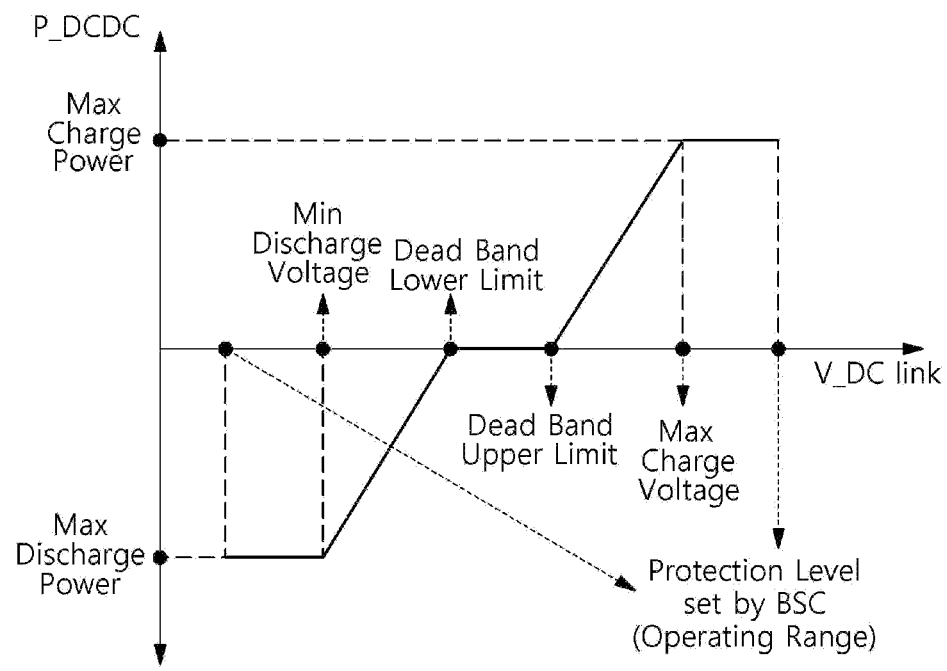

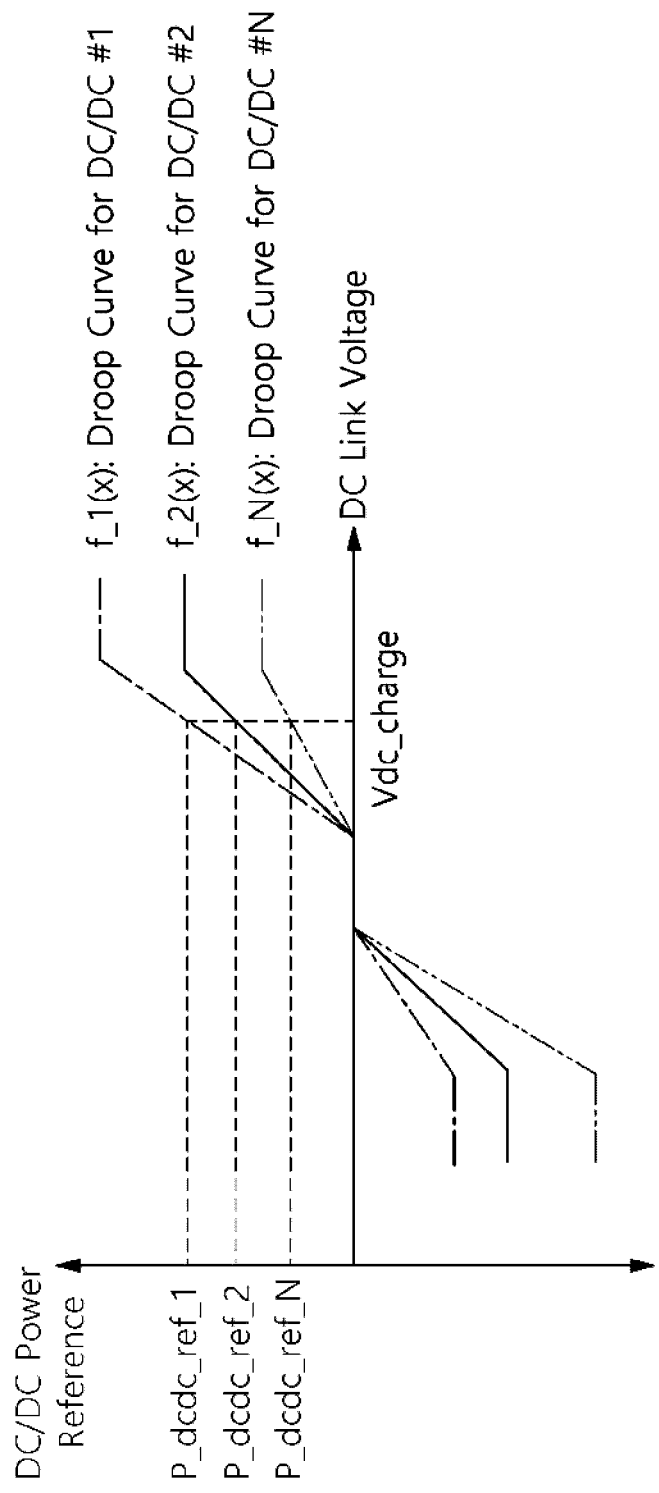
[Figure 5]

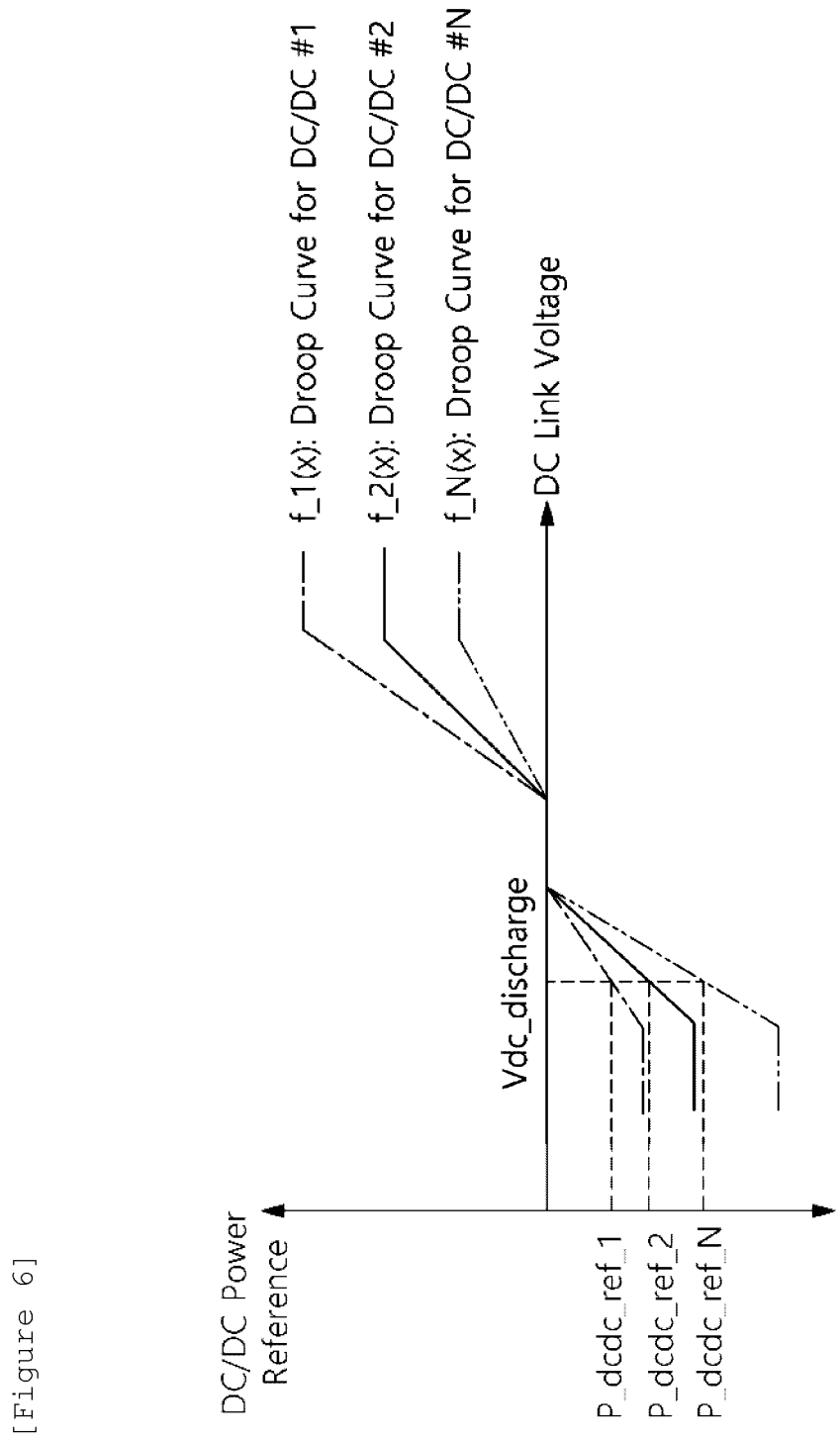
[Figure 6]

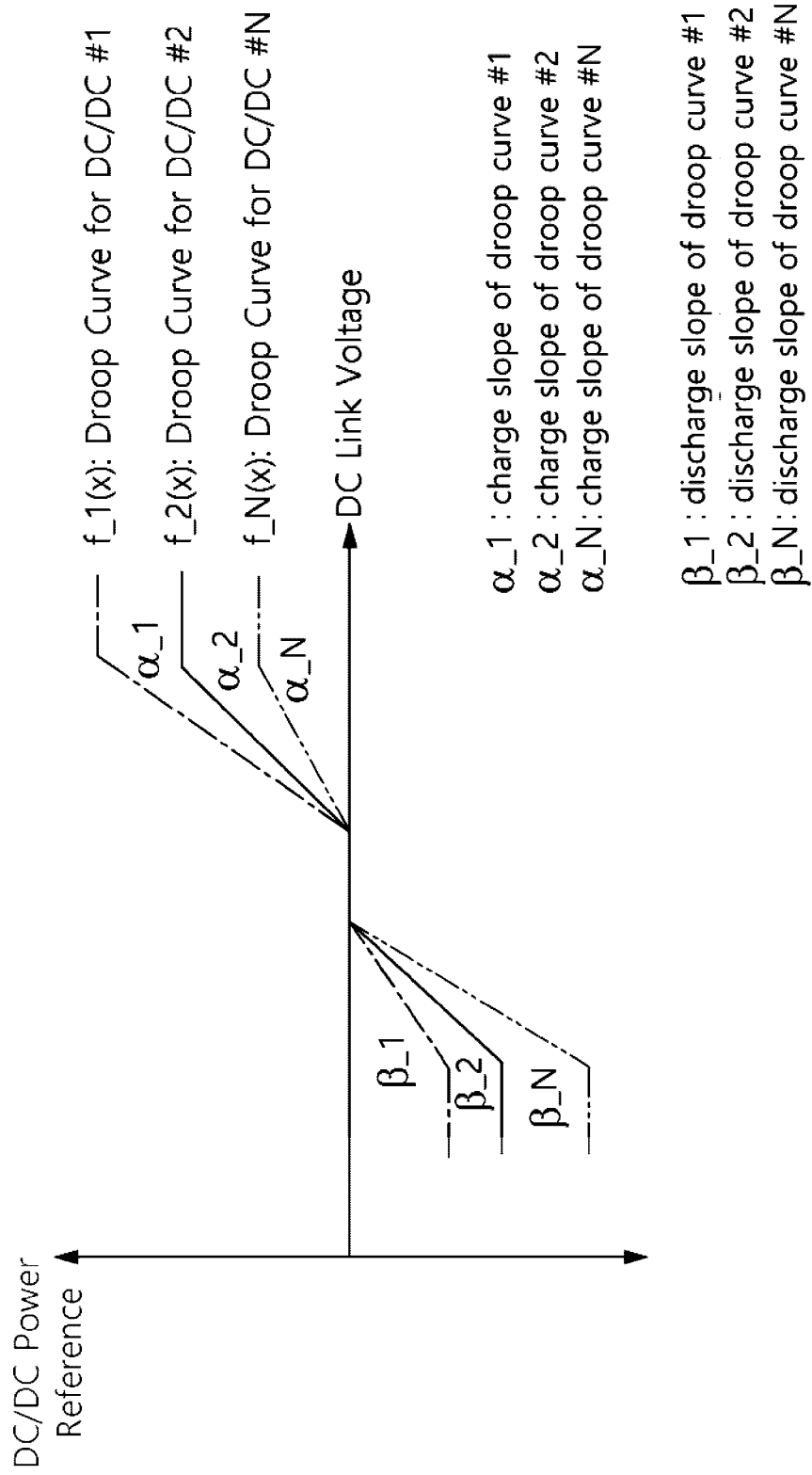
[Figure 7]

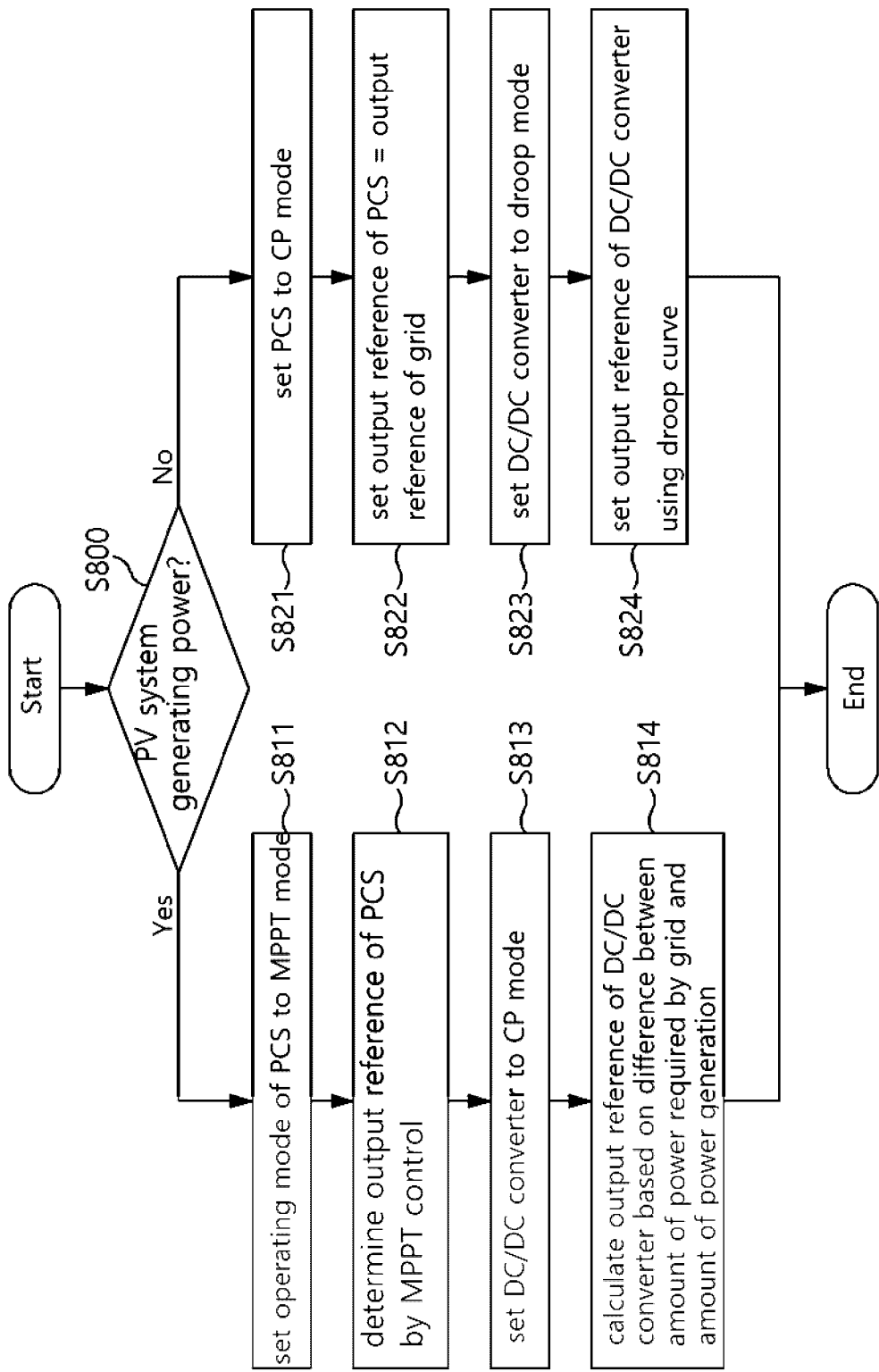
[Figure 8]

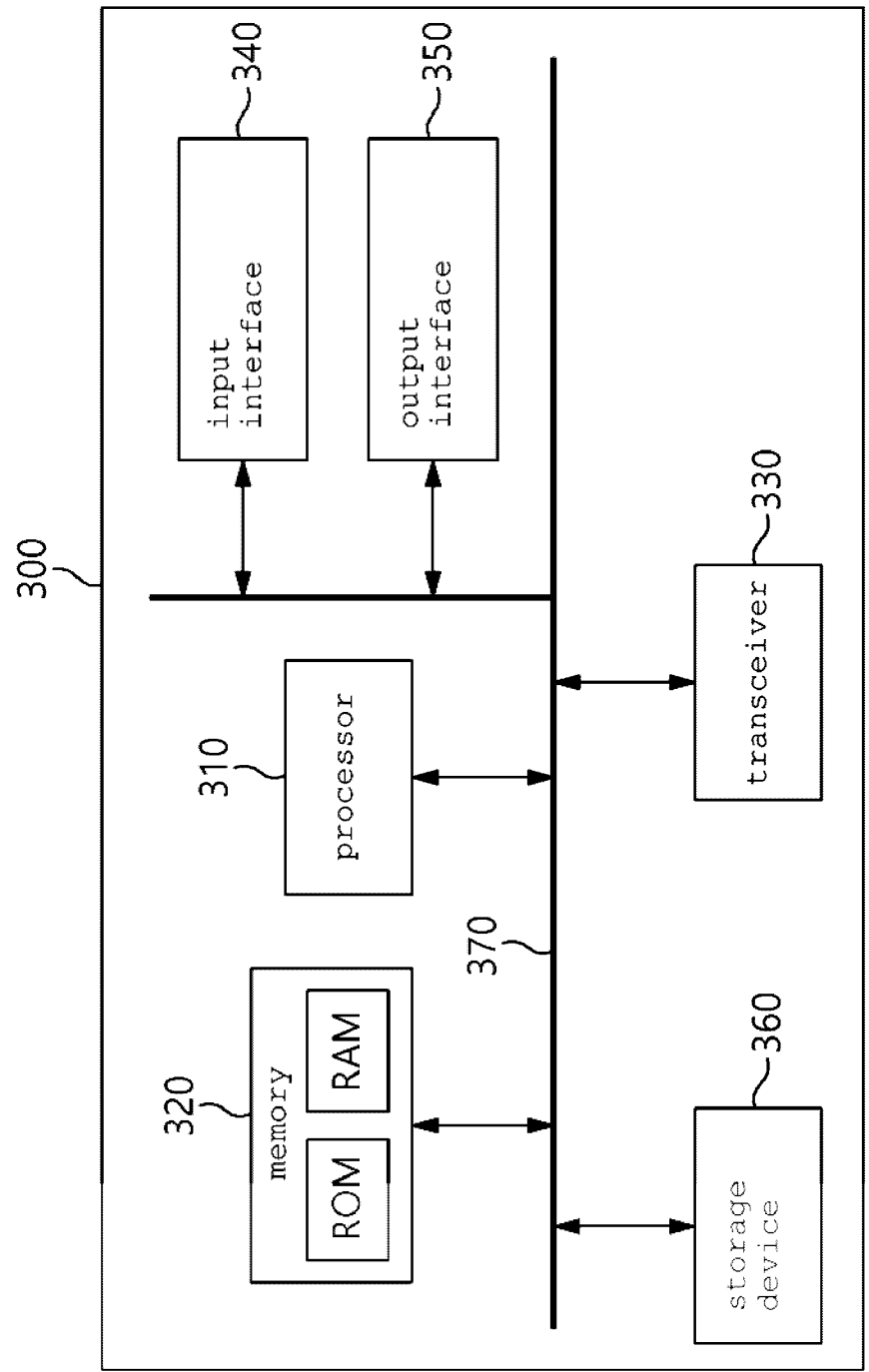

ENERGY STORAGE SYSTEM ASSOCIATED WITH SOLAR SYSTEM AND METHOD FOR CONTROLLING ENERGY STORAGE SYSTEM

CROSS REFERENCE TO RELATED APPLICATIONS

This application claims priority to and the benefit of Korean Patent Application No. 10-2021-0132117 filed in the Korean Intellectual Property Office on Oct. 6, 2021, the entire contents of which are incorporated herein by reference.

TECHNICAL FIELD

The present invention relates to an energy storage system and a method for controlling an energy storage system, and more particularly, to an energy storage system connected with a photovoltaic system and a method for controlling an energy storage system.

BACKGROUND ART

An energy storage system relates to renewable energy, a battery that stores electric power, and a power grid. Recently, as a spread of smart grid and renewable energy is expanding and efficiency and stability of the power system are emphasized, a demand for energy storage systems for power supply and demand control and power quality improvement is increasing. Depending on a purpose of use, energy storage systems may have different outputs and capacities. In order to configure a large-capacity energy storage system, a plurality of battery systems may be connected.

An energy storage system connected with a photovoltaic (PV) system is changing from an alternating current (AC)-coupled system to a direct current (DC)-coupled system. In a DC-coupled energy storage system, the PV system and the battery system operate in DC voltages, but the power grid operates in AC voltages, and thus, a power conversion device is needed.

In a DC-coupled system, a large-capacity central power converter (DC/DC converter) is usually applied. In such a system, a Power Management System (PMS)/Energy Management System (EMS) monitors a state of each component and determines outputs of a DC/AC converter (PCS), a DC/DC converter, and a battery. However, in such a system, a problem arises that it is impossible to control each of the battery racks individually. In addition, an appropriate control method is also required when an energy storage system is coupled with a photovoltaic system.

DETAILED DESCRIPTION OF THE INVENTION

Technical Problem

To obviate one or more problems of the related art, embodiments of the present disclosure provide an energy storage system interworking with a photovoltaic system.

To obviate one or more problems of the related art, embodiments of the present disclosure provide a method for controlling the energy storage system.

To obviate one or more problems of the related art, embodiments of the present disclosure provide a power management controller for controlling operations of an energy storage system.

Technical Solution

In order to achieve the objective of the present disclosure, an energy storage system, connected with a photovoltaic system and a power grid, may comprise: a plurality of DC/DC converters configured to control a plurality of battery racks; a power conversion system configured to control power in connection with the plurality of DC/DC converters and the photovoltaic system; and a power management controller configured to determine operating modes and output references of the power conversion system and the plurality of DC/DC converters according to a state of the photovoltaic system.

The power management controller can be configured to determine the operating mode of the power conversion system and the operating mode of each DC/DC converter according to whether the photovoltaic system is generating power or not.

The power management controller may further be configured to set the operating mode of the power conversion system to a Maximum Power Point Tracking (MPPT) mode and set the operating mode of each DC/DC converter to a constant power (CP) mode when the photovoltaic system is generating power. Here, the output reference of the power conversion system may be determined by MPPT control. Furthermore, the output reference of each DC/DC converter may be calculated based on a difference between an amount of power required by the grid and an amount of power generation by the photovoltaic system.

Meanwhile, the power management controller may further be configured to set the operating mode of the power conversion system to a constant power mode and set the operating mode of each DC/DC converter to a droop mode when the photovoltaic system is not generating power. Here, the output reference of the power conversion system may be set equal to the output reference of the grid, and the output reference of each DC/DC converter may be set using a droop curve determined by the battery section controller of the energy storage system.

The energy storage system may further comprise a battery section controller configured to receive information about the mode of each DC/DC converter and the output reference value of the plurality of batteries in a constant power mode from the power management controller and to control the output of each DC/DC converter.

The battery section controller may further be configured to determine an output reference of each DC/DC converter in the constant power mode based on a state of each battery rack in real time and to provide the output reference of each DC/DC converter to a corresponding DC/DC converter.

According to another embodiment of the present disclosure, a method for controlling an energy storage system including a plurality of batteries, a plurality of DC/DC converters, a power conversion system, and a power management controller, wherein the energy storage system is connected with a photovoltaic system and a power grid, the method may comprise: determining, by the power management controller, a state of the photovoltaic system based on whether the photovoltaic system is generating power or not; determining, by the power management controller, an operating mode of the power conversion system and an operating mode of each DC/DC converter according to the state of the photovoltaic system; and determining, by the power management controller, an output reference of the power conversion system and an output reference of each DC/DC converter according to the determined operating mode of the power control device and the determined operating mode of each DC/DC converter.

The determining the operating mode of the power conversion system and the operating mode of each DC/DC converter may include, upon the photovoltaic system generating power, setting the operating mode of the power conversion system to a Maximum Power Point Tracking (MPPT) mode, and setting the operating mode of each DC/DC converter to a constant power (CP) mode. Here, the output reference of the power conversion system may be determined by MPPT control. The output reference of each DC/DC converter may be calculated based on a difference between an amount of power required by the grid and an amount of power generation.

The determining the operating mode of the power conversion system and the operating mode of each DC/DC converter may include, upon the photovoltaic system not generating power, setting the operating mode of the power conversion system to a constant power mode; and setting the operating mode of each DC/DC converter to a droop mode. Here, the output reference of the power conversion system may be set equal to the output reference of the grid, and the output reference of each DC/DC converter is set by a droop curve determined by the battery section controller.

The method may further include receiving, by a battery section controller, information about the mode of each DC/DC converter and the output reference value of the battery in a constant power mode from the power management controller; and controlling, by the battery section controller, the output of each DC/DC converter according to a decided operating mode information.

The controlling, by the battery section controller, the output of each DC/DC converter may comprise: determining an output reference of each DC/DC converter in the constant power mode based on a state of each battery rack in real time; and providing the output reference of each DC/DC converter to a corresponding DC/DC converter.

The controlling, by the battery section controller, the output of each DC/DC converter may comprise: setting a droop curve for each DC/DC converter based on a state of each battery rack in the droop mode; and providing information on the droop curve to a corresponding DC/DC converter before each DC/DC converter starts operating.

According to another embodiment of the present disclosure, a power management controller, located in an energy storage system including a plurality of batteries, a plurality of DC/DC converters, and a power conversion system, wherein the energy storage system is connected with a photovoltaic system and a power grid, may include at least one processor and a memory for storing at least one instruction executed by the processor.

Here, the at least one instruction may include: an instruction to determine a state of the photovoltaic system based on whether the photovoltaic system is generating power; an instruction to determine an operating mode of the power conversion system and each DC/DC converter according to the state of the photovoltaic system; an instruction to determine an output reference of the power conversion system and an output reference of each DC/DC converter according to the determined operating mode of the power control device and the determined operating mode of each DC/DC converter.

The at least one instruction may further include an instruction to provide information about the mode of each DC/DC converter and the output reference value of the plurality of batteries in a constant power mode to a battery section controller of the energy storage system.

Here, the instruction to determine an operating mode of the power conversion system and each DC/DC converter may include, upon the photovoltaic system generating power, instruction to set the operating mode of the power conversion system to a Maximum Power Point Tracking (MPPT) mode and instruction to set the operating mode of each DC/DC converter to a constant power (CP) mode.

In addition, the instruction to determine an operating mode of the power conversion system and each DC/DC converter may include, upon the photovoltaic system not generating power, an instruction to set the operating mode of the power conversion system to a constant power mode and an instruction to set the operating mode of each DC/DC converter to a droop mode.

Advantageous Effects

According to embodiments of the present disclosure, when an energy storage system including a plurality of battery racks is connected with a photovoltaic system, it is possible to efficiently control and operate individual battery racks in the energy storage system according to a state of the photovoltaic system.

BRIEF DESCRIPTION OF THE DRAWINGS

FIG. 1 is a block diagram of a DC-coupled energy storage system coupled with a PV (Photovoltaic) system to which the present invention may be applied.

FIG. 2 illustrates a concept of determining an operating mode and a power reference according to a PV state according to embodiments of the present invention.

FIG. 3 is a conceptual diagram of detailed control in a battery section of an energy storage system according to embodiments of the present invention.

FIG. 4 is a graph illustrating a droop curve used for output control of a DC/DC converter according to embodiments of the present invention.

FIG. 5 is a graph showing an output reference calculation process of a plurality of DC/DC converters in a charge process according to embodiments of the present invention and FIG. 6 is a graph showing an output reference calculation process of a plurality of DC/DC converters in a discharge process according to embodiments of the present invention.

FIG. 7 is a graph showing a concept of calculating slopes of droop curves of a plurality of DC/DC converters in a charge/discharge process according to embodiments of the present invention.

FIG. 8 is an operational flowchart of a method for controlling an energy storage system according to embodiments of the present invention.

FIG. 9 is a block diagram of a power management controller according to embodiments of the present invention.

BEST MODES FOR PRACTICING THE DISCLOSURE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Some terms used herein are defined as follows.

A nominal capacity (Nominal Capa.) refers to a capacity [Ah] of a battery during development by a battery manufacturer.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting module units in series/parallel, module units being set by a battery manufacturer. A battery rack can be monitored and controlled by a battery management system (BMS). A battery rack may include several battery modules and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure. A battery section controller may also be referred to a battery system controller.

A power limit refers to a limit of power that can be output from a battery, which is set in advance by a battery manufacturer based on a battery condition. A rack power limit may mean an output power limit ([kw]) set for a rack level, and can be set based on a SOC and a temperature of the battery.

The power limit can be a charge power limit or a discharge power limit depending on whether charging or discharging is applied. In addition, according to a battery system structure, a rack power limit or a bank power limit may be defined.

Hereinafter, exemplary embodiments of the present invention will be described in detail with reference to the accompanying drawings.

FIG. 1 is a block diagram of a DC-coupled energy storage system coupled with a PV (Photovoltaic) system to which the present invention may be applied.

In a DC-coupled energy storage system, a DC/DC converter 500 capable of individually controlling a DC voltage/current for each battery system is essential. Since the DC/DC converter is placed in the battery system, the DC/AC converter that was used for interconnecting with the photovoltaic system is no longer needed, and thereby increasing system efficiency. In addition, by applying a DC/DC converter to each battery system, it performs not only existing protection control of the battery system, but also power control of battery racks based on characteristics of individual battery systems even when there is a difference in terms of SOC, SOH (State of Health), or a capacity among battery racks.

FIG. 1 shows an example of a DC coupled system in which the output terminal of a PV (Photovoltaic) system 700 is connected to an output terminal of a DC/DC converter 500 and an input terminal of a PCS 400.

In an energy storage system (ESS), a battery is used for storing energy or power. Typically, multiple battery modules may form a battery rack and multiple battery racks may form a battery bank. Here, depending on a device or a system in which the battery is used, a battery rack may be referred to as a battery pack. Battery #1, battery #2, . . . , and battery #N shown in FIG. 1 may be a battery pack or a battery rack.

Referring to FIG. 1, a battery management system (BMS) 100 may be installed for each battery. The BMS 100 may monitor a current, a voltage and a temperature of each battery pack (or rack) to be managed, calculate a state Of charge (SOC) of the battery based on a monitoring result to control charging and discharging. In the instance that each battery in the system of FIG. 1 is a battery rack, the BMS 100 may be a rack BMS (RBMS).

A battery section controller (BSC) 200 may be located in each battery section which includes a plurality of batteries, peripheral circuits, and devices to monitor and control objects such as a voltage, a current, a temperature, and a circuit breaker.

A power conversion system (PCS) 400 installed in each battery section may control power supplied from the outside and power supplied from the battery section to the outside, thereby controlling charging and discharging of the battery. The power conversion system may include a DC/AC inverter. The output of the DC/DC converter 500 may be connected to the PCS 400 and the PCS 400 may be connected to the power grid 600. Here, the PCS 400 typically operates in a constant power mode. A power management system (PMS) 300 connected to the PCS may control the output of the PCS based on the monitoring and control results of the battery management system or the battery section controller.

In the energy storage system of FIG. 1, battery #1 is connected to DC/DC converter #1, battery #2 is connected to DC/DC converter #2, and battery #N is connected to DC/DC #N. The output of the DC/DC converter corresponding to each battery is connected to the PCS 400 through a DC link.

The DC/DC converter may be a bidirectional converter, wherein when conversion is performed from the battery to the load direction, the input of the DC/DC converter is connected to a battery (a battery unit, a battery rack or a battery pack) and the output of the DC/DC converter may be connected to a load. As examples of the DC/DC converter, various types of converters such as a full-bridge converter, a half-bridge converter, and a flyback converter may be used.

Meanwhile, communication among the BMS 100, the BSC 200, the PMS 300, and the PCS 400 may be implemented through Controller Area Network (CAN) or Ethernet (indicated by a dotted line in FIG. 1).

According to embodiments of the present invention shown in FIG. 1, the BSC 200 which is configured to manage overall control of the battery section may report state information of each battery to the PMS 300. Here, the state information of each battery may include information such as a state of charge (SOC), a state of health (SOH), a voltage, and a temperature of each battery. The BSC 200 may provide information such as power limit (P_battery_limit) and real power (P_battery_real) of each battery to the power management system 300. The power management system 300 in charge of controlling the entire energy storage system may issue a charge command or a discharge command (via P_pcs_reference) to the power conversion system 400 during system operation.

Here, the battery section controller (BSC) 200 determines an output reference for each DC/DC converter in consideration of a state of each battery. In the embodiments according to the present invention, the output reference of an individual DC/DC converter may be set in different ways according to a droop mode or a CP (constant power) mode.

When the output of the DC/DC converter is controlled according to a droop mode, the battery section controller may set a droop curve for each DC/DC converter in consideration of a state of each battery and provide it to a corresponding DC/DC converter before the system operation starts. Meanwhile, when the DC/DC converter operates in a constant power (CP) mode, a power reference of each DC/DC converter may be determined during system operation and provided to a corresponding DC/DC converter.

During an actual operation of the energy storage system, a power management controller (PMS) may transmit a charge/discharge command to the power conversion system and the battery section controller. Here, the power management controller may monitor states of the photovoltaic system (PV), the grid, and the battery in real time, and may determine operating modes and output references of components in the energy storage system based on an operation command (Pgrid*) received from an EMS (Energy Management System).

FIG. 2 illustrates a concept of determining an operating mode and a power reference according to a PV state according to embodiments of the present invention.

In embodiments of the present invention, the power management controller may determine a state of the system after monitoring states of respective components, that is, the PV, the battery, and the grid. In other words, the state of the system can be defined according to whether the PV system is generating power, whether the DC/DC converter is charging and discharging, and whether the PCS is operating. Here, the state of the system may include a stop state and a stand-by state. In addition, when the system is operating normally, the state of the system may include a state that the PCS starts operation and the PV system generates an output higher than a reference point, a state in which a photovoltaic power generation and a battery discharge occur at the same time, a state in which charging from the grid to the battery is performed, a state in which the amount of solar power generation is sufficient to supply power to the grid and charge the battery, and a state in which all the amount of solar power is charged to the battery, a state in which all the power of the battery is discharged to the grid.

Among these states, the embodiments of the present invention is focused on two cases, which are when the PV system is generating power and when the PV system is in off state. In addition, the embodiments of the present invention define operating modes and power references (Ppcs*, Pbat*) of the power conversion system and the plurality of DC/DC converters for each of the two cases.

Referring to FIG. 2, when the photovoltaic system is generating power, the power conversion system operates in a Maximum Power Point Tracking (MPPT) mode and the DC/DC converter operates in a Constant Power (CP) mode. The value of the output reference Ppcs* of the PCS may be determined through MPPT control by the power conversion system. Here, the Maximum Power Point Tracking (MPPT) control is a form of control that allows to obtain the maximum power by appropriately adjusting a load according to external situations. A point at which the maximum power is transmitted is referred to as the maximum power point, and the maximum power point may be changed according to external conditions such as solar radiation and temperatures.

Furthermore, Pbat*, which is the output reference of the battery, may be calculated and determined by the power management controller (Power management system 300 in FIG. 2), and may be calculated based on a difference between an amount of power required by the grid and an amount of power generation. If the value of Pbat* is a negative value (−), the battery section may perform charging according to the value. Furthermore, if the value of Pbat* is a positive value (+), the battery section may perform discharging according to the value.

Meanwhile, in a state in which the photovoltaic system has stopped generating power, for example, at night, the power conversion system may operate in a CP mode and the DC/DC converter may operate in a droop mode. Here, the output reference Ppcs* of the power conversion system becomes the output reference Pgrid* of the grid. Furthermore, the output of the DC/DC converter in the battery section (the sum of the outputs of the plurality of DC/DC converters) is equal to Ppcs*, but an output of the individual DC/DC converter may be determined by a value set by a droop curve and individual control.

FIG. 3 is a conceptual diagram of detailed control in a battery section of an energy storage system according to embodiments of the present invention.

The battery section controller may receive information on the operating modes and the value of Pbat* in the CP mode from the PMS, and may perform a power distribution and rack balancing algorithm according to the present invention. Furthermore, the battery section controller may receive battery related information from the Rack BMS(RBMS). Here, the battery related information may include a state of charge (SOC), a state of health (SOH), a current (Ibat_1, Ibat_2, . . . Ibat_n), a voltage (Vbat_1, Vbat_2, . . . Vbat_n), and a temperature of each battery rack.

The battery section controller may perform different DC/DC converter controls according to whether the operating mode received from the PMS is the CP mode or the droop mode. In the CP mode, the battery section controller may determine output reference values of the DC/DC converters in real time based on the state information of the rack received from each RBMS. Here, each DC/DC converter or the controller in each DC/DC converter may output power in real time by following the received output power reference in real time.

Meanwhile, in the droop mode, the battery section controller may set a droop curve of the DC/DC converters based on a state of each battery rack and provide it to each DC/DC converter. Each DC/DC converter may determine its own output reference value of each DC/DC converter based on a real-time DC link voltage value, Vdc. The DC/DC converter may control the output power by following the determined power reference value in real time.

Here, when the system operates in the droop mode, voltage Vdc of the DC link where the output of the DC/DC converter 500 and the input of the PCS 400 meet may fluctuate due to an operation of the PCS 400 following a received charge or discharge command. Here, each DC/DC converter may sense the fluctuating DC link voltage, and calculate a DC/DC output reference by referring to a droop curve preset for itself. A DC/DC converter may use a calculated output reference to perform output control to follow the output reference in real time.

FIG. 4 is a graph illustrating a droop curve used for output control of a DC/DC converter according to embodiments of the present invention.

In the graph of FIG. 4, the horizontal axis represents a voltage (V_DC link) of the DC link, and the vertical axis represents an output power (P_DCDC) of the DC/DC converter corresponding to each battery.

The battery section controller may control the output power of the DC/DC converter corresponding to each battery by controlling the slope of the droop curve in consideration of the state of each battery. In addition, the battery section controller may set a charge/discharge operation range by setting a Max Charge Power and a Max Discharge Power.

In the droop curve shown in FIG. 4, the dead band in which charging and discharging are not performed may be defined by the Dead Band Upper Limit and the Dead Band Lower Limit. Further, in the droop curve of FIG. 4, a Maximum charge voltage at which charging is stopped because charging to the maximum has performed and a Minimum discharge voltage at which discharging is stopped.

As described above, in the present invention, the droop curve control is for maintaining the voltage of the DC link constant and the dead-band is for preventing frequent charging/discharging due to noise and sensing errors in a standby state. The dead band may be set, for example, in a range of 850-900V, which is a voltage range of the DC link in a standby state.

FIG. 5 is a graph showing an output reference calculation process of a plurality of DC/DC converters in a charge process according to embodiments of the present invention and FIG. 6 is a graph showing an output reference calculation process of a plurality of DC/DC converters in a discharge process according to embodiments of the present invention.

In FIGS. 5 and 6, each curve represents a droop curve of each DC/DC converter. In FIGS. 5 and 6, the power references in a section in which the DC link voltage is constant indicates a Max Charge Power and a Max Discharge Power.

Equation 1 below shows a function for each droop curve.

$$P\_dcdc\_ref\_N = f\_N(x)$$ [Equation 1]

In Equation 1, P_dcdc_ref indicates an output reference of each DC/DC converter, and f_N(x) indicates a droop curve function of DC/DC converter N. In addition, x represents the DC link voltage Vdc which becomes Vdc_charge during charging and Vdc discharge during discharging.

In other words, Equation 1 presents that the DC/DC converter performs output control according to a value defined by the droop curve function.

Equation 2 below indicates the sum of the outputs of droop curve functions corresponding to the output power of the PCS during charging, and is balanced at the Vdc_charge shown in FIG. 5.

$$P\_pcs\_charge\_ref = f1(Vdc\_charge) + f\_2(Vdc\_charge) \ldots + f\_N(Vdc\_charge)$$ [Equation 2]

In addition, Equation 3 below indicates the sum of the outputs of droop curve functions corresponding to the output power of the PCS during discharge, and is balanced at the Vdc_discharge.

$$P\_pcs\_discharge\_ref = f\_1(Vdc\_discharge) + f\_2(Vdc\_discharge) \ldots + f\_N(Vdc\_discharge)$$ [Equation 3]

In Equations 2 and 3, P_pcs_ref represents the output reference of the PCS, Vdc_charge represents the balanced voltage of the DC link during charging, and Vdc_discharge represents the balanced voltage of the DC link during discharging.

FIG. 7 is a graph showing a concept of calculating slopes of droop curves of a plurality of DC/DC converters in a charge/discharge process according to embodiments of the present invention.

The graph of FIG. 7 shows the slopes of the droop curves of the plurality of DC/DC converters, and the slopes of the curves are different from each other.

In the present invention, the slope of the droop curve for each DC/DC converter may be determined based on a battery capacity (Cap_N) and a SOC value, and additionally a SOH. Accordingly, the charge slope ratio ($\alpha\_1 : \alpha\_2 : \ldots : \alpha\_N$) according to the droop curve for each battery may be defined as in Equation 4 below.

$$\alpha\_1 : \alpha\_2 : \ldots : \alpha\_N = Cap\_1 \times (1 - SOC\_1) : Cap\_2 \times (1 - SOC\_2) \ldots : Cap\_N \times (1 - SOC\_N)$$ [Equation 4]

It is clarified from Equation 4 that a charge slope of each battery is proportional to an empty space area (1−SOC_N) of the battery capable of storing additional energy and the capacity of each battery (Cap_N).

Furthermore, the discharge slope ratio ($\beta\_1 : \beta\_2 : \ldots : \beta\_N$) according to the droop curve for each battery may be defined as in Equation 5 below.

$$\beta\_1 : \beta\_2 : \ldots : \beta\_N = Cap\_1 \times SOC\_1 : Cap\_2 \times SOC\_2 \ldots : Cap\_N \times SOC\_N$$ [Equation 5]

Here, Cap_N indicates a capacity [Wh] of battery N, and SOC_N indicates a SOC of battery N.

Since the discharge slope of each battery is related to how much energy stored in the battery to be extracted, the discharge slope is proportional to the SOC and the battery capacity (Cap_N) of each battery.

As described above, when the system of the present invention operates in a droop mode, the DC/DC converter does not receive an output reference of the battery from a central controller during the operation of the energy storage system, but instead, the DC/DC converter may quickly calculate an output reference value based on a preset droop curve and apply the output reference value to output control, before the DC/DC converter actually starts operating, and thus, a stable system operation can be expected.

FIG. 8 is an operational flowchart of a method for controlling an energy storage system according to embodiments of the present invention.

The embodiment of FIG. 8 shows a sequence of operations in a method for controlling an energy storage system that includes a plurality of batteries, a plurality of DC/DC converters, a power conversion system (PCS), and a power management controller (or power management system; PMS), and is connected with a solar photovoltaic system and the power grid.

The method of controlling the energy storage system according to the present embodiment may be performed by one or more of a power management controller (PMS), a power conversion system (PCS), a battery section controller (BSC), and a plurality of DC/DC converters.

Referring to FIG. 8, in the energy storage system interworking with the solar photovoltaic system, the power management controller may check the state of the PV system. Specifically, the power management controller checks whether the PV system is generating power or not (S800). The power management controller may determine operating modes of the power conversion system and the DC/DC converter according to the state of the PV system. In addition, the output reference of the power conversion system and the output reference of the DC/DC converter are determined according to the determined operating modes of the power conversion system and the DC/DC converter.

Specifically, when the PV system is generating power, the operating mode of power conversion system is set to a Maximum Power Point Tracking (MPPT) mode (S811). In addition, the value of the output reference of the PCS is determined by the MPPT control (S812). Here, a MPPT control algorithm may be performed by the power conversion system.

In addition, when the PV system is generating power, the DC/DC converter is set to a constant power mode (S813). Here, the output reference of the DC/DC converter may be calculated based on a difference between an amount of power required by the grid and an amount of power generation (S814).

On the other hand, when the PV system is not generating power, the PCS is set to a constant power mode (S821), and the output reference of the PCS is set to be the same as the output reference of the grid (S822). In addition, when the PV system is not generating power, the DC/DC converter may be set to a droop mode (S823), and an output reference of the DC/DC converter may be set by a droop curve determined by the battery section controller (S824). In other words, the droop curve is set by the battery section controller which was notified that the operating mode of the DC/DC converter is a droop mode. Furthermore, the output power of the DC/DC converter may be controlled using the droop curve by each DC/DC converter which received information on the droop curve in advance.

FIG. 9 is a block diagram of a power management controller according to embodiments of the present invention.

The power managing apparatus 300 may include at least one processor 310, a memory 320 for storing at least one instruction executed by the processor, and a transceiver 330 for communicating with other components in the energy storage system.

The at least one instruction may include: an instruction to determine a state of the PV system based on whether the photovoltaic system is generating power; an instruction to determine an operating mode of the power conversion system and the DC/DC converter according to the state of the photovoltaic system; an instruction to determine an output reference of the power conversion system and an output reference of the DC/DC converter according to the determined operating mode of the power control device and the determined operating mode of the DC/DC converter; and an instruction to provide information about the mode of the DC/DC converter and the output reference value of the battery in a constant power mode to a battery section controller.

Here, the instruction to determine an operating mode of the power conversion system and the DC/DC converter may include, upon the photovoltaic system generating power, instruction to set the operating mode of the power conversion system to a Maximum Power Point Tracking (MPPT) mode and instruction to set the operating mode of the DC/DC converter to a constant power (CP) mode.

In addition, the instruction to determine an operating mode of the power conversion system and the DC/DC converter may include, upon the photovoltaic system not generating power, an instruction to set the operating mode of the power conversion system to a constant power mode and an instruction to set the operating mode of the DC/DC converter to a droop mode.

The power management controller 300 may further include an input interface 340, an output interface 350, a storage device 360, and the like. Components included in the power managing apparatus 300 may be connected by a bus 370 to communicate with each other.

The processor 310 may execute a program instruction stored in at least one of the memory 320 and the storage device 360. Here, the processor may include a central processing unit (CPU), a graphics processing unit (GPU), or a dedicated processor on which a method according to embodiments of the present invention are performed. The memory (or storage device) may be configured as at least one of a volatile storage medium and a non-volatile storage medium. For example, the memory may be configured as at least one of a read only memory (ROM) and a random access memory (RAM).

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

What is claimed is:

1. An energy storage system connected with a photovoltaic system and a power grid, the energy storage system comprising:
    a plurality of direct current/direct current (DC/DC) converters configured to control a plurality of battery racks including a plurality of batteries;
    a power conversion system configured to control power in connection with the plurality of DC/DC converters and the photovoltaic system; and
    a power management controller configured to determine operating modes and output references of the power conversion system and the plurality of DC/DC converters according to a state of the photovoltaic system.

2. The energy storage system of claim 1, wherein the power management controller is configured to determine the operating mode of the power conversion system and the operating mode of each DC/DC converter according to whether the photovoltaic system is generating power or not.

3. The energy storage system of claim 1, wherein the power management controller is further configured to set the operating mode of the power conversion system to a maximum power point tracking (MPPT) mode and set the operating mode of each DC/DC converter to a constant power (CP) mode when the photovoltaic system is generating power.

4. The energy storage system of claim 3, wherein the output reference of the power conversion system is determined by MPPT control.

5. The energy storage system of claim 3, wherein the output reference of each DC/DC converter is calculated based on a difference between an amount of power required by the power grid and an amount of power generation by the photovoltaic system.

6. The energy storage system of claim 1, wherein the power management controller is further configured to set the operating mode of the power conversion system to a constant power mode and set the operating mode of each DC/DC converter to a droop mode when the photovoltaic system is not generating power.

7. The energy storage system of claim 6, wherein the output reference of the power conversion system is set equal to an output reference of the power grid, and the output reference of each DC/DC converter is set using a droop curve determined by a battery section controller of the energy storage system.

8. The energy storage system of claim 1, further comprising:
    a battery section controller configured to receive information about the operating mode of each DC/DC converter and an output reference value of the plurality of batteries in a constant power mode from the power management controller and control an output of each DC/DC converter.

9. The energy storage system of claim 8, wherein the battery section controller is further configured to determine an output reference of each DC/DC converter in the constant power mode based on a state of each battery rack in real time and provide the output reference of each DC/DC converter to a corresponding DC/DC converter.

10. The energy storage system of claim 8, wherein the battery section controller is further configured to set a droop curve for each DC/DC converter based on a state of each battery rack in a droop mode, and provide information on the droop curve to a corresponding DC/DC converter before each DC/DC converter starts operating.

11. A method for controlling an energy storage system including a plurality of batteries, a plurality of direct current/direct current (DC/DC) converters, a power conversion system, and a power management controller, wherein the energy storage system is connected with a photovoltaic system and a power grid, the method comprising:
    determining, by the power management controller, a state of the photovoltaic system based on whether the photovoltaic system is generating power or not;
    determining, by the power management controller, an operating mode of the power conversion system and an operating mode of each DC/DC converter according to the state of the photovoltaic system; and
    determining, by the power management controller, an output reference of the power conversion system and an output reference of each DC/DC converter according to the determined operating mode of the power conversion system and the determined operating mode of each DC/DC converter.

12. The method of claim 11, wherein the determining the operating mode of the power conversion system and the operating mode of each DC/DC converter includes:
    upon the photovoltaic system generating power,
    setting the operating mode of the power conversion system to a maximum power point tracking (MPPT) mode; and
    setting the operating mode of each DC/DC converter to a constant power (CP) mode.

13. The method of claim 12, wherein the output reference of the power conversion system is determined by MPPT control.

14. The method of claim 12, wherein the output reference of each DC/DC converter is calculated based on a difference between an amount of power required by the power grid and an amount of power generation by the photovoltaic system.

15. The method of claim 11, wherein the determining the operating mode of the power conversion system and the operating mode of each DC/DC converter includes:
    upon the photovoltaic system not generating power,
    setting the operating mode of the power conversion system to a constant power mode; and
    setting the operating mode of each DC/DC converter to a droop mode.

16. The method of claim 15, wherein the output reference of the power conversion system is set equal to an output reference of the power grid, and the output reference of each DC/DC converter is set by a droop curve determined by a battery section controller of the energy storage system.

17. The method of claim 11, further comprising:
    receiving, by a battery section controller of the energy storage system, information about the operating mode of each DC/DC converter and an output reference value of the plurality of batteries in a constant power mode from the power management controller; and controlling, by the battery section controller, an output of each DC/DC converter according to a decided operating mode information.

18. The method of claim 17, wherein the controlling, by the battery section controller, the output of each DC/DC converter, comprises:
determining an output reference of each DC/DC converter in the constant power mode based on a state of the plurality of batteries included in each battery rack in real time; and
providing the output reference of each DC/DC converter to a corresponding DC/DC converter.

19. The method of claim 17, wherein the controlling, by the battery section controller, the output of each DC/DC converter, comprises:
setting a droop curve for each DC/DC converter based on a state of the plurality of batteries included in each battery rack in a droop mode; and
providing information on the droop curve to a corresponding DC/DC converter before each DC/DC converter starts operating.

20. A power management controller located in an energy storage system including a plurality of batteries, a plurality of direct current/direct current (DC/DC) converters, and a power conversion system, wherein the energy storage system is connected with a photovoltaic system and a power grid, the power management controller comprising:
at least one processor; and
a memory configured to store at least one instruction executed by the at least one processor,
wherein the at least one instruction includes:
an instruction to determine a state of the photovoltaic system based on whether the photovoltaic system is generating power or not;
an instruction to determine an operating mode of the power conversion system and an operating mode of each DC/DC converter according to the state of the photovoltaic system; and
an instruction to determine an output reference of the power conversion system and an output reference of each DC/DC converter according to the determined operating mode of the power conversion system and the determined operating mode of each DC/DC converter.

21. The power management controller of claim 20, wherein the at least one instruction further comprises an instruction to provide information about the operating mode of each DC/DC converter and the output reference of each DC/DC converter for the plurality of batteries in a constant power mode to a battery section controller of the energy storage system.

22. The power management controller of claim 20, wherein the instruction to determine the operating mode of the power conversion system and the operating mode of each DC/DC converter includes:
upon the photovoltaic system generating power,
an instruction to set the operating mode of the power conversion system to a maximum power point tracking (MPPT) mode; and
an instruction to set the operating mode of each DC/DC converter to a constant power (CP) mode.

23. The power management controller of claim 20, wherein the instruction to determine the operating mode of the power conversion system and the operating mode of each DC/DC converter includes:
upon the photovoltaic system not generating power,
an instruction to set the operating mode of the power conversion system to a constant power mode; and
an instruction to set the operating mode of each DC/DC converter to a droop mode.

* * * * *